United States Patent
Sudre

(10) Patent No.: US 12,441,665 B2
(45) Date of Patent: Oct. 14, 2025

(54) COMPOSITE COMPONENT WITH ENVIRONMENTAL PROTECTION

(71) Applicant: RAYTHEON TECHNOLOGIES CORPORATION, Farmington, CT (US)

(72) Inventor: Olivier H. Sudre, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 33 days.

(21) Appl. No.: 18/213,665

(22) Filed: Jun. 23, 2023

(65) Prior Publication Data
US 2024/0425423 A1     Dec. 26, 2024

(51) Int. Cl.
| C04B 41/00 | (2006.01) |
| C04B 41/45 | (2006.01) |
| C04B 41/81 | (2006.01) |
| F02C 7/00 | (2006.01) |

(52) U.S. Cl.
CPC ........ *C04B 41/009* (2013.01); *C04B 41/4523* (2013.01); *C04B 41/4539* (2013.01); *C04B 41/455* (2013.01); *C04B 41/81* (2013.01); *F02C 7/00* (2013.01); *F05D 2230/90* (2013.01); *F05D 2300/6033* (2013.01)

(58) Field of Classification Search
CPC . C04B 41/009; C04B 41/4523; C04B 41/455; C04B 41/81; C04B 41/87; F05D 2230/90; F05D 2300/6033
See application file for complete search history.

(56) References Cited

U.S. PATENT DOCUMENTS

| 7,641,941 B2 | 1/2010 | Mazany et al. |
| 10,024,175 B2 | 7/2018 | Varney |
| 10,941,079 B2 | 3/2021 | Shim et al. |
| 2016/0251270 A1* | 9/2016 | Steibel ............... B32B 5/18 428/307.7 |
| 2017/0081250 A1* | 3/2017 | Kamel ............... B33Y 70/00 |
| 2018/0194695 A1 | 7/2018 | Magdefrau et al. |
| 2018/0305264 A1 | 10/2018 | Sambasivan et al. |
| 2019/0323112 A1* | 10/2019 | Shim ............... C23C 28/36 |
| 2021/0198160 A1 | 7/2021 | Shim et al. |
| 2022/0388912 A1* | 12/2022 | Sudre ............... C04B 35/563 |

FOREIGN PATENT DOCUMENTS

| EP | 3904314 A1 | 11/2021 |
| JP | 2008247722 A | 10/2008 |

OTHER PUBLICATIONS

Extended European Search Report for Application No. EP24184126 dated Nov. 26, 2024.

\* cited by examiner

*Primary Examiner* — Nathaniel E Wiehe
*Assistant Examiner* — Maxime M Adjagbe
(74) *Attorney, Agent, or Firm* — Carlson, Gaskey & Olds, P.C.

(57) ABSTRACT

An article includes a ceramic matrix composite article including ceramic-based reinforcements disposed in a ceramic-based matrix and a barrier layer present at least in part within bounds of the ceramic-based matrix of the ceramic matrix composite article. A method of applying a barrier layer to an article is also disclosed.

16 Claims, 4 Drawing Sheets

COMPOSITE COMPONENT WITH ENVIRONMENTAL PROTECTION

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include features that provide environmental protection.

SUMMARY

A ceramic matrix composite article according to an exemplary embodiment of this disclosure, among other possible things includes ceramic-based reinforcements disposed in a ceramic-based matrix and a barrier layer present at least in part within bounds of the ceramic-based matrix of the ceramic matrix composite article.

In a further example of the foregoing, the barrier layer includes gettering particles.

In a further example of any of the foregoing, the barrier layer includes a top zone extending beyond the ceramic-based matrix and disposed on the surface of the ceramic matrix composite article.

In a further example of any of the foregoing, the ceramic-based reinforcements are fibers.

In a further example of any of the foregoing, the ceramic-based reinforcements are arranged in a three-dimensional weave.

In a further example of any of the foregoing, the ceramic-based reinforcements are arranged in a two-dimensional weave.

In a further example of any of the foregoing, the article includes an infiltrated zone in which the barrier layer is present within the bounds of the ceramic-based matrix. The infiltrated zone is at least about 100 microns thick.

A method of applying a barrier layer to an article according to an exemplary embodiment of this disclosure, among other possible things includes providing a ceramic matrix composite article including ceramic-based reinforcements disposed in a ceramic-based matrix and applying a barrier layer to the ceramic matrix composite article such that at least some of the barrier layer infiltrates into voids in the ceramic matrix composite article with a barrier layer.

In a further example of the foregoing, providing the ceramic matrix composite article includes providing fugitive reinforcements in the ceramic matrix composite article.

In a further example of any of the foregoing, the method includes removing the fugitive reinforcements, thereby leaving behind the voids.

In a further example of any of the foregoing, removing the fugitive reinforcements occurring during manufacture of the ceramic matrix composite article.

In a further example of any of the foregoing, the ceramic matrix composite article has a surface region having a looser weave structure compared to a weave structure in a body of the ceramic matrix composite article.

In a further example of any of the foregoing, the barrier layer is applied by slurry coating.

In a further example of any of the foregoing, the barrier layer is applied by one of melt infiltration and reactive melting.

In a further example of any of the foregoing, the barrier layer includes gettering particles.

In a further example of any of the foregoing, after the applying, the barrier layer includes a top zone extending beyond the ceramic-based matrix and disposed on the surface of the ceramic matrix composite article.

In a further example of any of the foregoing, the ceramic-based reinforcements are fibers.

In a further example of any of the foregoing, providing the ceramic matrix composite article includes weaving the fibers into a three-dimensional weave.

In a further example of any of the foregoing, providing the ceramic matrix composite article includes weaving the fibers into a two-dimensional weave.

In a further example of any of the foregoing, the article includes an infiltrated zone in which the barrier layer is present within the bounds of the ceramic-based matrix. The infiltrated zone is at least about 100 microns thick.

DETAILED DESCRIPTION

Figure 1:
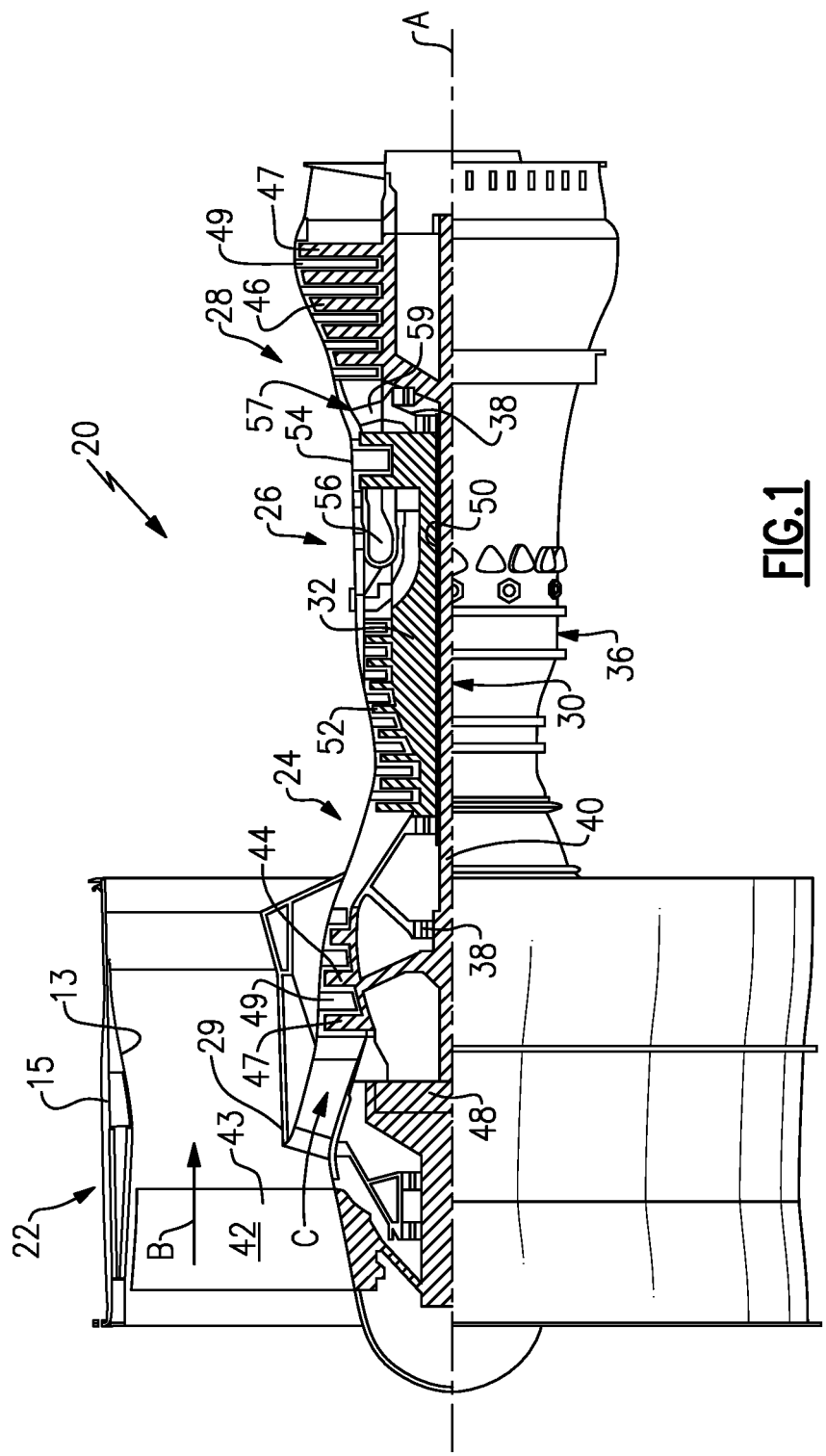
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7° R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades 42 in the fan section 22 disclose an example gas turbine engine 20 with increased power transfer efficiency.

Some components of the gas turbine engine, such as blades or seals, comprise ceramic matrix composites ("CMC"). CMCs include, generally, ceramic-based reinforcement such as fibers or other reinforcements in a ceramic-based matrix. The use of CMCs for engine 20 components provide various benefits including high temperature capabilities as compared to traditional materials such as metals.

CMC components in certain applications benefit from environmental and/or thermal protection which can be provided by a barrier layer (coating) on the component. In conventional processes a coating is applied to a CMC article after the article is formed by application methods such as slurry coating. Some coatings are susceptible to cracking and/or brittle fracture depending on the composition of the coating, which decreases the lifetime and effectiveness of the coating. For instance, in the case of an environmental barrier, oxidants can be introduced into the coating via cracks and more easily reach the underlying CMC article. Moreover, some coatings are susceptible to delamination from the underlying substrate material, which can decrease its lifetime and effectives as well.

Figure 2:
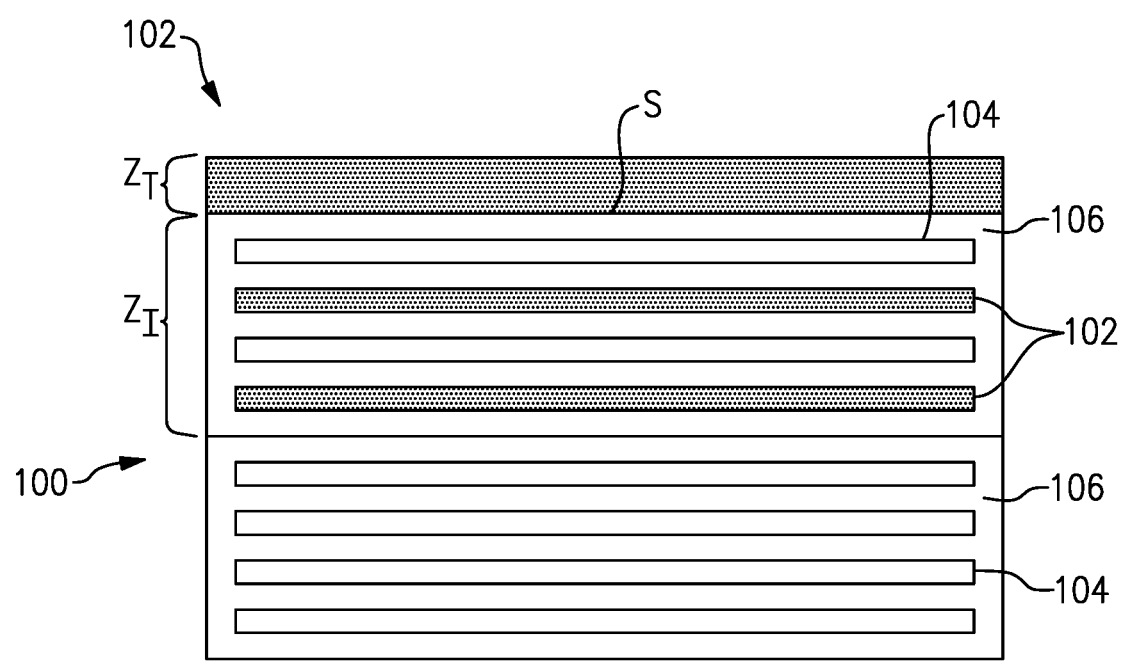
FIG. 2 schematically illustrates an example article having a barrier layer.

To that end, FIG. 2 schematically illustrates a representative portion of an example CMC article 100 for the gas turbine engine that includes an integrated barrier layer 102. The CMC article 100 includes ceramic-based reinforcements 104, which in this example are fibers, dispersed in a ceramic-based matrix 106. It should be understood that the reinforcements 104 in any of the examples discussed here could also be tows, which are bundles of fibers. The article 100 can be, for example, an airfoil in the compressor section 24 or turbine section 28, a combustor liner panel in the combustor section 26, a blade outer air seal, or other component that would benefit from the examples herein. In this example, the integrated barrier layer 102 is used as an environmental barrier layer to protect an underlying substrate from environmental conditions, as well as thermal conditions. As will be appreciated, the integrated barrier layer 102 can be used as a stand-alone barrier layer or in combination with other coating layers, such as, but not limited to, ceramic-based topcoats.

The integrated barrier layer 102 is integrated with the article 100 in that it is present at least in part within the structure of the CMC material of the article 100 (e.g., within the bounds of the matrix 106 of the CMC of the article 100).

In general, the integrated barrier layer 102 includes an integrated zone $Z_I$ in which barrier layer 102 is disposed within the matrix 106 and, optionally, a top zone $Z_T$ in which the barrier layer 102 extends beyond the matrix 106 and is disposed on the surface S of the CMC article 100. Because the barrier layer 102 is integrated into the CMC material of the article 100 the propensity for cracking and delamination are reduced, providing the barrier layer 102 with improved impact resistance. As will be discussed in detail herein, in general, the barrier layer 102 is formed by creating or providing voids in the CMC structure of the article 100 and infiltrating the barrier layer 102 into the voids.

In a particular example, the integrated zone $Z_I$ is at least about 100 microns thick.

Figure 3A:
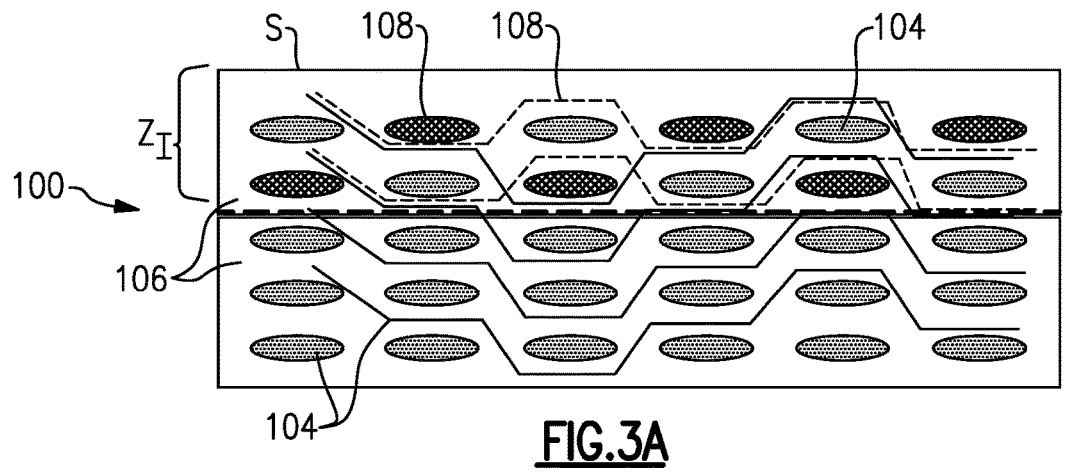
FIGS. 3A-C schematically illustrate an example article being infiltrated with the barrier layer.

FIG. 3A schematically illustrates a CMC article 100 with three-dimensional woven fiber reinforcements 104 situated in a matrix 106, prior to application of the barrier layer 102. In the view of FIG. 3A (and FIGS. 3B-C), a single fiber stack is shown. The CMC article 100 include fugitive fibers 108 near the surface S of the article 100 in what will become the integrated zone $Z_I$. The use of fugitive fibers is well-known in the art and will not be described in great detail herein. In general, the fugitive fibers comprise materials that can be dissolved away or burned off at relatively low temperatures, such as nylon or PVA (polyvinyl acetate). In the example of FIG. 3A the fugitive fibers 108 are integrated within the CMC article 100 in the same weave pattern as the fibers 104. However, in other example fugitive fibers 108 could be incorporated into the CMC article 100 with a different weave pattern.

Figure 3B:
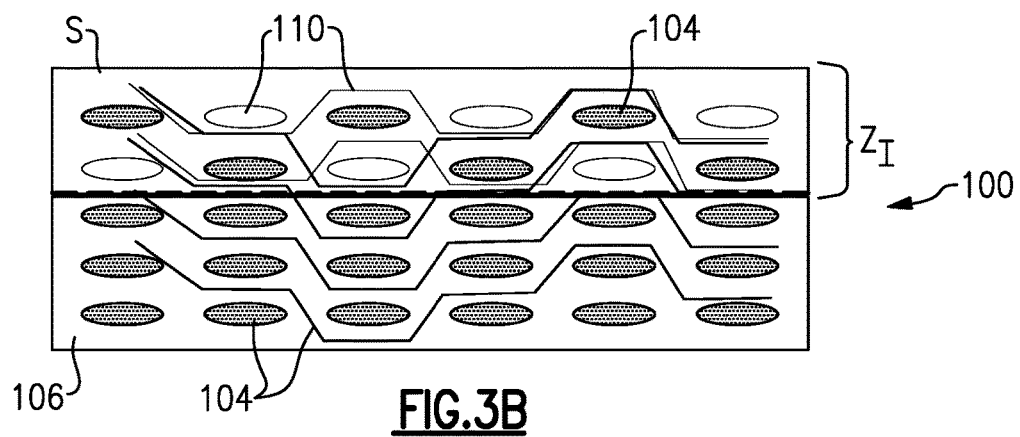

FIG. 3B shows the CMC article 100 with fugitive fibers 108 removed by any known method depending on the material selected for the fugitive fibers 108 and voids 110 left in place of the fugitive fibers 108. For instance, the removing can include heating to a temperature at which the fugitive fibers 108 burn off, which in some examples can occur during steps of manufacturing the CMC article 100 (which are well known in the art), such as during chemical vapor infiltration or other high temperature treatment of the preform. In general, the removing occurs after lay-up/preforming of the CMC article 100.

Figure 3C:
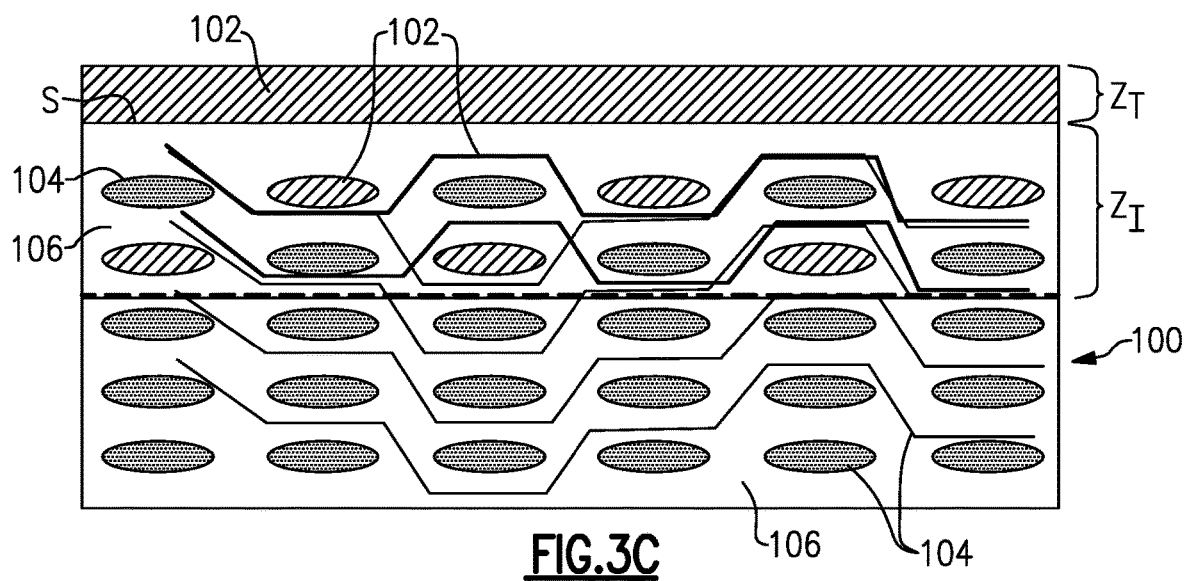

FIG. 3C shows the CMC article 100 with barrier layer 102 integrated into the integrated zone $Z_I$ (e.g., wherein the barrier layer 102 infiltrates the voids 110). In addition, FIG. 3C shows the optional top zone $Z_T$ in which the barrier layer 102 extends beyond the matrix 106 and is disposed on the surface S of the CMC article 100.

Figure 4A:
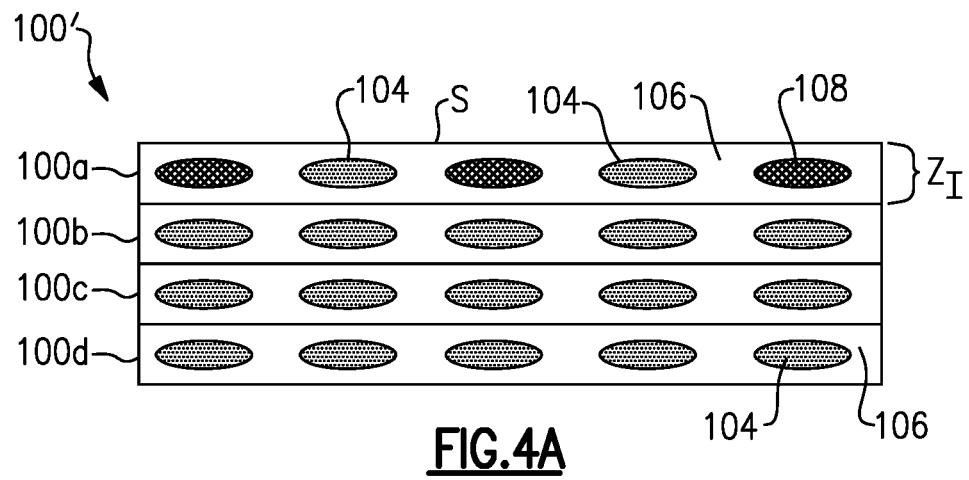
FIGS. 4A-C schematically illustrate another example article being infiltrated with the barrier layer.
Figure 4B:
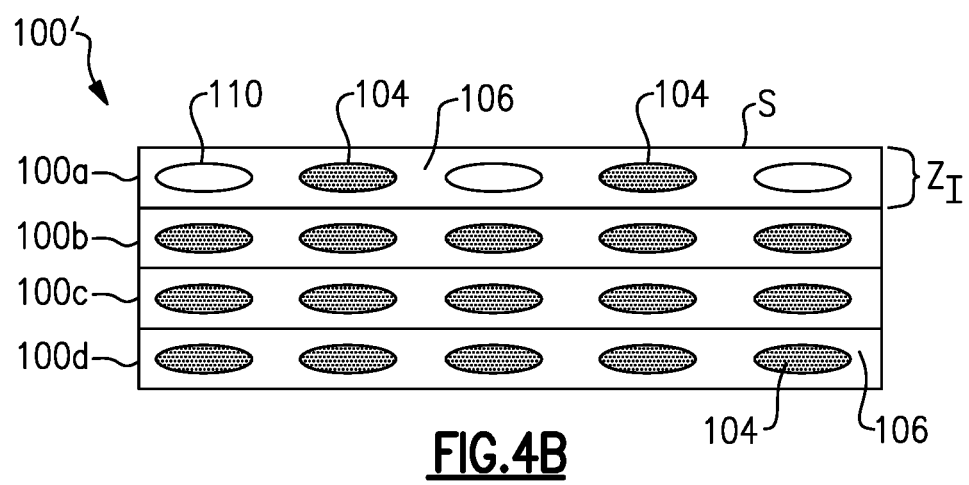
Figure 4C:
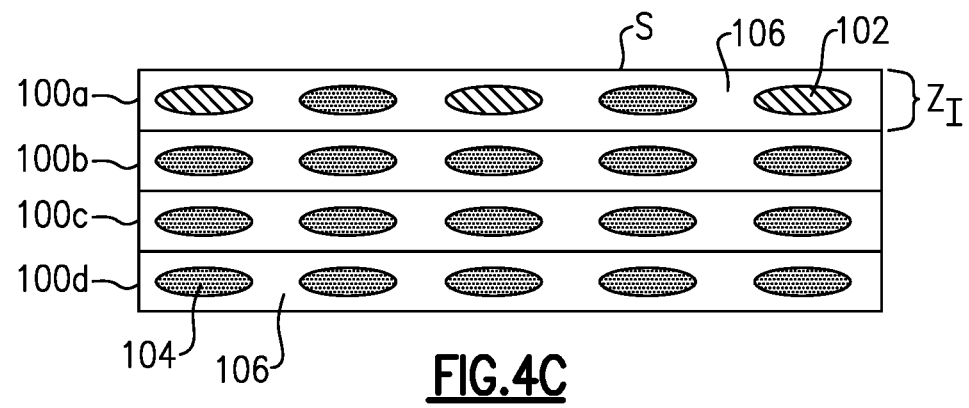

FIG. 4A schematically illustrates another example CMC article 100' with two-dimensional woven fiber reinforcements 104 situated in a matrix 106. In the view of FIGS. 4A-C, only out-of-plane reinforcements 104 are shown. In this example, the CMC article 100' comprises multiple plies 100a/100b/100c/100d of 2D woven fiber reinforcements 104 infiltrated with matrix 106. The outermost ply 100a comprises a combination of fugitive fibers 108 and fibers 104 of the CMC article 100. Moreover, in this example only one outermost ply 100a includes the fugitive fibers 108, but in other examples, there may be multiple plies that include the fugitive fibers 108 near the surface S of the CMC article 100.

FIG. 4B shows the CMC article 100' with fugitive fibers 108 removed and voids 110 left in place of the fugitive fibers 108. For instance, the removing can include heating to a temperature at which the fugitive fibers 108 burn off.

FIG. 4C shows the CMC article 100' with barrier layer 102 integrated into the integrated zone $Z_I$ (e.g., wherein the barrier layer 102 infiltrates the voids 110). FIG. 4C does not show the optional top zone $Z_T$, but one could be used as discussed above.

Though in the examples discussed above voids 110 are created by removing fugitive fibers 108, it should be understood that in other examples fugitive fibers 108 may not be used. Instead, CMC article 100/100' may include voids 110 in the form of porosity within the matrix 106. The CMC article 100/100' could be formed with graded porosity decreasing from the body of the CMC article 100/100' to its surface by various manufacturing techniques known in the art. For instance, the CMC article 100/100' could be provided with a surface region having a looser weave structure compared to the weave structure in the body of the CMC article 100/100'. The surface region, which later becomes the integration zone $Z_I$, therefore has larger spaces between adjacent fibers 104 and as a result will tend to have higher porosity after matrix 106 infiltration. Said voids 110 can be infiltrated with the barrier layer 102 as discussed above.

In a particular example, the barrier layer 102 provides at least environmental protection to the CMC article 100/100'. In that respect, the barrier layer 102 can in some examples include gettering particles dispersed in a matrix (which may be different from the matrix 106 of the CMC article 100/100'). The gettering particles can react with oxidant particles, such as oxygen or water, that could diffuse into the barrier layer 102. In this way, the gettering particles could reduce the likelihood of those oxidant particles reaching and oxidizing the CMC article 100/100'. The gettering particles thus function as an oxygen and moisture diffusion barrier to limit the exposure of the underlying CMC article 100 to oxygen and/or moisture from the surrounding environment. The barrier layer 102 may optionally also include diffusive particles. Without being bound by any particular theory, the diffusive particles enhance oxidation and moisture protection by diffusion of some or all of the composition constituents to the outer surface of the barrier layer 102 and forming a sealing layer that seals the underlying CMC article 100/100' from oxygen/moisture exposure. Additionally, the diffusive particles may include cationic metal species which can diffuse into the gettering particles to enhance oxidation stability of the gettering particle material. Further, the diffusion behavior of the diffusive particles may operate to seal any microcracks that could form in the barrier layer 102. Sealing the micro-cracks could prevent oxygen from infiltrating the barrier layer 102, which further enhances the oxidation resistance of the barrier layer.

The barrier layer 102 can be applied by any method suitable for the composition of the barrier layer 102 that enables the barrier layer 102 material to infiltrate into voids 110. For instance for the example barrier layer 102 discussed above the matrix material, gettering particles, and optional diffusive particles could be provided in the form of a slurry, applied to the CMC article by painting, dipping, spraying, or any suitable method, thereby infiltrating the barrier layer 102 into the voids 110 and optionally forming the top zone $Z_T$, and then curing or sintering the barrier layer 102 as would be known in the art. Melt infiltration or reactive melting, both of which are known in the art, could also be used to apply and infiltrate the barrier layer 102. In particular melt infiltration/reactive melting are particularly well-suited for barrier layers 102 including silicates, such as rare earth silicates. In this particular example the delocalized nature of the barrier layer 102 dispersed within the voids 110 in the integrated zone $Z_I$ improves the oxidation resistance of the barrier layer 102 as compared to other coating system by providing more sites for potential neutralization of oxidants.

The infiltration of the barrier layer 102 into the voids 110 creates an integrated zone $Z_I$ that has a lower porosity (higher density) than the body of the CMC article 100/100'. The lower porosity/higher density also contributes to the protective properties of the barrier layer 102 against environmental factors by reducing the propensity of oxidants to enter into the body of the CMC article 100/100' (known as "shielding").

As used herein, the term "about" and "approximately" have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
    providing a ceramic matrix composite article including ceramic-based reinforcements disposed in a ceramic-based matrix; and
    applying a barrier layer to the ceramic matrix composite article such that the barrier layer infiltrates into voids in the ceramic matrix composite article
    wherein the ceramic matrix composite article has a surface region having a looser weave structure compared to a weave structure in a body of the ceramic matrix composite article.

2. The method of claim 1, wherein providing the ceramic matrix composite article includes providing fugitive reinforcements in the ceramic matrix composite article, wherein the fugitive reinforcements are fugitive fibers.

3. The method of claim 2, further comprising removing the fugitive reinforcements, thereby leaving behind the voids.

4. The method of claim 3, wherein removing the fugitive reinforcements occurring during manufacture of the ceramic matrix composite article.

5. The method of claim 2, wherein the ceramic-based reinforcements are fibers and providing the ceramic matrix composite article includes weaving the fibers into a first weave pattern, and wherein the providing the fugitive reinforcements in the ceramic matrix composite article includes weaving the fugitive fibers of the fugitive reinforcements into a second weave pattern.

6. The method of claim 5, wherein the first weave pattern and the second weave pattern are the same.

7. The method of claim 5, wherein first weave pattern and the second weave pattern are different.

8. The method of claim 1, wherein the barrier layer is applied by slurry coating.

9. The method of claim 1, wherein the barrier layer is applied by one of melt infiltration and reactive melting.

10. The method of claim 1, wherein after the applying, the barrier layer includes a top zone extending beyond the ceramic-based matrix and disposed on the surface of the ceramic matrix composite article.

11. The method of claim 10, wherein the top zone excludes ceramic-based reinforcements.

12. The method of claim 1, wherein the ceramic-based reinforcements are fibers.

13. The method of claim 12, wherein providing the ceramic matrix composite article includes weaving the fibers into a three-dimensional weave.

14. The method of claim 12, wherein providing the ceramic matrix composite article includes weaving the fibers into a two-dimensional weave.

15. The method of claim 1, wherein the article includes an infiltrated zone in which the barrier layer is present within the bounds of the ceramic-based matrix, and wherein the infiltrated zone is at least about 100 microns thick.

16. The method of claim 1, wherein the weave structure of the surface region is more open than the weave structure of the body.

* * * * *